United States Patent [19]

Wood

[11] 4,075,049
[45] Feb. 21, 1978

[54] METHOD OF PREPARING RETROREFLECTIVE SHEETING

[75] Inventor: William A. Wood, Newtown, Pa.

[73] Assignee: Minnesota Mining and Manufacturing Company, St. Paul, Minn.

[21] Appl. No.: 719,647

[22] Filed: Sept. 1, 1976

[51] Int. Cl.² .................. B44C 1/00; B32B 31/20; B31F 1/00
[52] U.S. Cl. .................. 156/220; 40/615; 40/616; 156/234; 156/235; 156/240; 156/298; 350/105; 427/152; 427/163; 427/199; 427/204; 427/278; 428/40; 428/914
[58] Field of Search .......... 156/234, 235, 240, 241, 156/247–249, 298, 303.1, 220; 40/135, 136; 96/1 PS; 116/63 R, 63 P; 404/14, 16; 428/172, 325, 40, 914; 427/148, 192, 137, 199, 204, 149, 278, 163; 350/105

[56] References Cited

U.S. PATENT DOCUMENTS

| | | | |
|---|---|---|---|
| 3,065,559 | 11/1962 | McKenzie | 350/105 X |
| 3,190,178 | 6/1965 | McKenzie | 350/105 |
| 3,836,364 | 9/1974 | Lin | 96/1 PS |
| 3,971,692 | 7/1976 | Anderson | 156/241 |
| 3,975,195 | 8/1976 | Goffe | 96/1 PS |

*Primary Examiner*—Charles E. Van Horn
*Assistant Examiner*—Thomas Bokan
*Attorney, Agent, or Firm*—Cruzan Alexander; Donald M. Sell; Roger R. Tamte

[57] ABSTRACT

Retroreflective sheeting having improved resistance to delamination is prepared by imparting a grid pattern to a monolayer of glass spheres having a light reflecting layer thereon, applying a sphere binder layer over the grid pattern imposed on the monolayer of glass spheres so as to adhere to the reflective layer on the monolayer of glass spheres, and pressure consolidating the resulting composite against a clear, protective overlay film, wherein the overlay film bonds to the sphere binder layer in the grooves formed by the grid pattern.

9 Claims, 8 Drawing Figures

METHOD OF PREPARING RETROREFLECTIVE SHEETING

BACKGROUND OF THE INVENTION

This invention relates to an improved method for preparing sphere-based retroreflective sheeting.

Retroreflective sheeting is commonly used for safety or advertising purposes, and generally wherever it is desired to draw attention to a surface when light impinges upon the surface from the direction of the viewer. One form of retroreflective sheeting material having high brilliance incorporates glass beads or spheres which provide a lens action in conjunction with a reflective material behind the spheres, such as a metallized surface or film. Since retroflective sheeting of this type is most often used in outdoor locations, sheeting has been developed in which the glass spheres and reflective surface behind the spheres is enclosed between weather-resistant plastic films or sheeting.

U.S. Pat. No. 3,190,178 to McKenzie discloses improvements in sphere-based, closed lens type retroreflective sheeting, especially means for anchoring the sphere lens elements between cover and backing films to provide a hermetic seal against moisture penetration under varying conditions of outdoor use. Although high brilliance is obtained by the sheeting of the McKenzie patent, by maintaining air pockets between the transparent cover film and the surfaces of the spheres which are not coated with a reflecting metallic deposit, the structure still suffers from delamination due to inadequate bonding.

OBJECTS AND SUMMARY

Accordingly, an object of the invention is to provide method of preparing sphere-based, hermetically sealed retroreflective sheeting having improved resistance to delamination under varying conditions of use. This and other objects, features and advantages of the invention will become apparent from the following description.

The invention is an improvement upon known methods of making enclosed sphere-based retroreflective sheeting, such as described in U.S. Pat. No. 3,190,178, in that the clear, protective overlay of film of the structure is more positively bonded at discrete anchoring points to the sphere binder layer of the structure. This is accomplished, in part, by imposing a grid pattern on a monolayer of glass spheres, temporarily adhered to a release sheet, in order to distribute the glass spheres in the monolayer into groups, the spacings between the groups corresponding to the grooves imparted by the grid pattern. Such spacings then provide essentially clear pathways for flow of resinous material which then connects or links the overlay film to the sphere binder layer in which the spheres are adhered and partially imbedded.

In another, preferred, aspect of the invention, improved structural stability and brilliance is obtained by using a sphere binder layer which is formed essentially of two layers, an outer layer having sufficient hardness to prevent spheres from becoming imbedded therein and a sphere-contacting, softer layer which bonds to the spheres. The outer, harder layer provides reinforcement and the inner layer, by selection of a suitable thickness, permits easier control, during lamination, of the depth of which the spheres sink into the binder resin.

In summary outline, the method of the invention comprises the steps of:

a. temporarily adhering a monolayer of glass spheres of substantially uniform diameter to a release sheet;

b. covering the exposed surfaces of the glass spheres with a light reflecting material to form a light reflecting layer on the monolayer of glass spheres;

c. imparting a grid pattern to the monolayer of glass spheres on the light reflecting layer such that the depth of the grid pattern is at least the radius of the glass spheres remaining in the monolayer;

d. applying a sphere binder layer over the grid pattern, the sphere binder layer having sufficient plastic flow to adhere to the light reflecting layer on the monolayer of spheres but not to the opposing surfaces of the spheres;

e. removing the release sheet to leave a sheet having distributed groups of monolayers of spheres thereon corresponding to the grid pattern; and f. pressure consolidating the resulting sheet against a clear, protective overlay film such that the overlay film bonds to the sphere binder layer in the grooves defined by the grid pattern.

DETAILED DESCRIPTION

The attached drawing diagrammatically illustrates the principal steps of the method of the invention.

Figure 1:
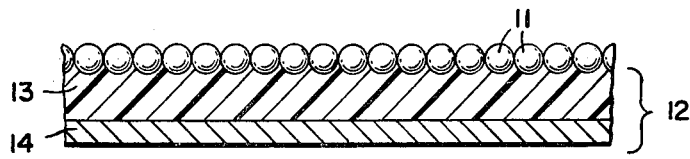

FIG. 1 illustrates step (a) of the process. With reference thereto, a monolayer of glass spheres 11 is temporarily adhered to a release sheet 12. Suitable release sheets have a polyethylene coating 13, of a thickness greater than the diameter of the glass spheres, on a paper substrate 14 or equivalent backing material. If desired, the opposing side of the paper backing 14 may also have a polyethylene layer to prevent curling of the release sheet, and the surface of the polyethylene layer 13 to which the spheres are to be bonded may be coated with a release agent such as a silicone material. However, neither expedient is critical to practice of the invention.

The spheres 11 are bonded to the polyethylene layer 13 by depositing on the polyethylene, glass spheres in excess of the number required to obtain a monolayer, followed by heating of the glass sphere covered release sheet for a time and at a temperature sufficient to soften the polyethylene so that the glass spheres will "float" in the polyethylene, that is, become slightly imbedded in the polyethylene without being submerged therein. Imbedment to the extent of about 10–40 percent of their diameters will be sufficient for the temporary bonding desired. Alternatively, the polyethylene of the release sheet may be heated before being contacted with the glass spheres. The glass sphere covered release sheet is then cooled to cause adherence of the spheres in contact with the polyethylene and the sheet is then tilted or turned over to release any excess (non-adhered) spheres.

Depending on the care taken in depositing and packing the glass spheres on the polyethylene and the softening treatment, a substantially monolayer of glass spheres 11 will result. Care is also taken to provide essentially sphere to sphere contact in the monolayer but random gaps between the spheres in the monolayer will not defeat the purposes of the invention.

Glass spheres useful in making the retroreflective sheeting of the invention are commercially available. Generally, these are glass spheres of about 1–10 mils in diameter, preferably about 2–4 mils, having a refractive index of about 1.90 ± 0.05. Preferred glass sphere lens elements are also chemically and physically inert to atmospheric conditions.

Figure 2:
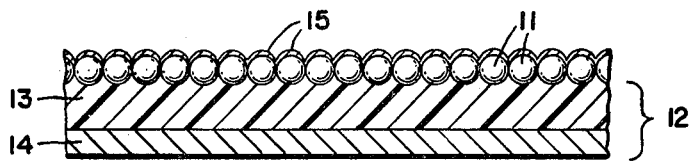

In step (b), illustrated in FIG. 2, the exposed surfaces of the glass spheres 11 are covered with a light reflecting material to form a light reflecting layer 15 on the glass spheres. Among the variety of materials used for this purpose are vacuum deposited metal coatings, metal foils and metal-coated plastic films. Vacuum vapor coating of a metal such as aluminum is preferred in order to obtain a continuous coating of the reflective material on the exposed surfaces of the glass spheres.

If desired, the deposition of light reflecting material may be preceded by coating the exposed surfaces of the spheres with a glass sphere binding resin, followed by hardening of the resin and removal by buffing of that portion of the resin on about the outer 20–50% total surface area of the spheres. This step is described in U.S. Pat. No. 3,190,178 and provides the advantage of masking reflective material which may be located between any spheres on the release sheet which are not in contact. As a result of such masking, the brilliance of retroreflection from the reflective layer on the glass spheres is not impeded by non-focused retroreflection from reflective material which might otherwise exist between the spheres. However, the approach has the disadvantage that angularity of retroreflection is somewhat less than can be obtained by not depositing such a coating.

Figure 3:
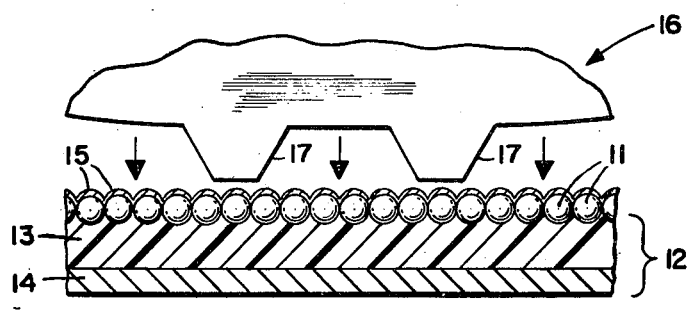

Step (c) of the method is critical. In this step, a grid pattern is imparted to the monolayer of glass spheres on the light reflecting layer thereof. As illustrated in FIG. 3, this is achieved by pressing a heated die member 16 having projecting die elements 17 against the monolayer of glass spheres 11 on the light reflecting layer. Any suitable die means may be used for this purpose, for example, a stamp roll. Preferably, the grid pattern is embossed using a heated, engraved roll. The grid pattern is continuous and may have any configuration providing a plurality of channels or grooves which are spaced apart sufficiently so that contact between a sphere binder film and an overlay film (described below) in the locations of the grooves will give overall dimensional stability to the retroreflective sheeting. Accordingly, the grid pattern may be intersecting lines, or polygonal figures such as hexagons, or the like.

Figure 4:
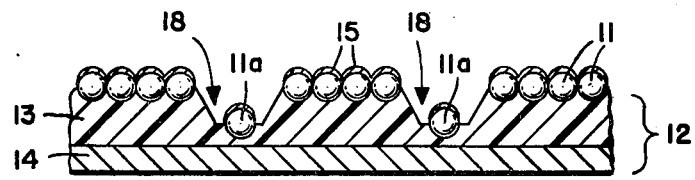

FIG. 4 illustrates the cross-sectional configuration of the resulting grid pattern imposed on the reflective, sphere coated release sheet. It will be noted that the monolayer of spheres becomes distributed over the surface of the polyethylene layer 13 into groups of spheres, separated by grooves 18 in the polyethylene corresponding to the shape of die elements 17. Spheres 11a are displaced into the grooves as a result of contact the grid with die elements 17; however, as a general rule, the spheres remaining in the monolayer on the surface of the polyethylene are not horizontally dislocated. Die elements 17 are selected such that the resulting grid pattern grooves 18 have depths greater than the radius of the spheres, preferably about 2–4 times the radius of the spheres.

Figure 5A:
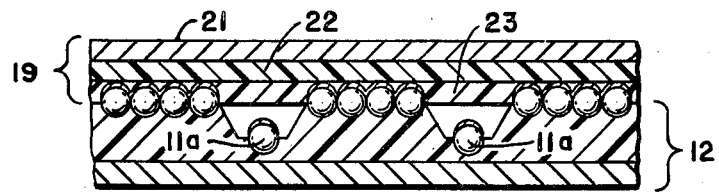
Figure 5B:
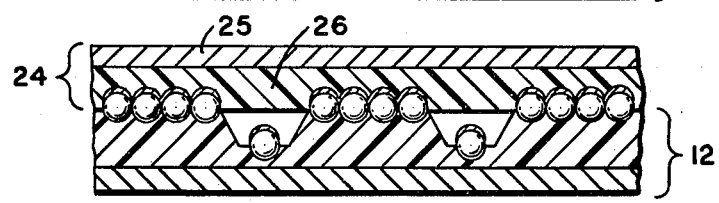

In step (d), illustrated in the alternative embodiments of FIGS. 5a and 5b, a sphere binder layer is applied over the monolayer of spheres on the light reflecting layer 15 thereof. Any sheeting or film having at least one surface which will undergo plastic flow as a result of heating, solvent activation, pressure or other means of activation, or any combination thereof, is useful provided that the material undergoing plastic flow enters grid pattern grooves 18 to the extent of no more than about the radius of the spheres remaining on the surface of the polyethylene layer 13. This is important in order to avoid bonding of the spheres in grooves 18 to the sphere binder material. The material must also be resoftenable at a later stage in order to bond to an overlay film (described below). Such materials are thermoplastic resins. Acrylic resins are preferred due to their weatherability.

FIG. 5a shows one embodiment of sphere binder layer in the form of a multilayered composite 19. Composite 19 comprises a backing material 21 such as paper upon which has first been cast a thermoset or thermoplastic film 22 having sufficient hardness to prevent the spheres from becoming imbedded therein upon consolidation of the total structure. A second adhesive layer or film 23 is cast on or adhered to film 22, film 23 being sufficiently soft or softenable so that it will have the required flow. The thickness of layers 22 and 23 will depend upon the resins from which the films are formed and the hardness of each film. Film 23 controls the depth to which the spheres will become imbedded. Therefore, the thickness of film 23 is more critical than the thickness of film 22. A suitable layer 22 is a thermoplastic acrylic resin such as Rhoplex AC-658 (Rohm and Haas Company) having a 1–3 mil dry film thickness, cast on a backing material 21 such as paper or a release material such as "Mylar" polyester film, polycarbonate or the like. A suitable layer 23 is Acryloid B-72 (Rohm and Haas Company) which is coated on top of the Rhoplex AC-658 to provide a dry film thickness of about 1–3 mils. The thickness of the latter is selected so that upon consolidation with the sphere covered release sheet 12, the depth of plastic flow into grooves 18 will be no more than about the radius of the spheres 11.

FIG. 5b illustrates an alternate form of sphere binder material 24 of essentially single layer construction. In this case, there is cast onto a backing material such as a paper sheet 25 a single layer of resin to form a film 26. The single layer 26 will require somewhat more care in application to the sphere covered release sheet 12 but essentially the same results can be obtained as in the embodiment of FIG. 5a by careful softening of the surface to be place in contact with the glass spheres. This is conveniently achieved by brief exposure of layer 26 to solvent vapor and by then applying the thus-softened material to the sphere monolayer. A suitable material for this purpose is an Acryloid B-72 thermoplastic acrylic resin film of about 2–4 mils dry thickness which has been cast on a paper liner.

After application of structures 19 or 24 to the sphere covered release sheet 12, the resulting composite stack is consolidated in any suitable manner, for example, by passing the composite structure through cylindrical nip rolls preheated to about 250° F. The lamination pressure is adjusted in order to obtain sufficient plastic flow for bonding with the sphere monolayer while minimizing flow into the grooves 18 of the grid pattern.

Backing materials 21 and 25 are not required in structures 19 and 24. In the illustrated embodiments they merely provide a convenient means for casting films from resin dispersions and of providing some stiffness to the resulting sheeting. Instead, backing materials 21 and 25 may be eliminated and self-supporting, preformed films used.

Figure 6:
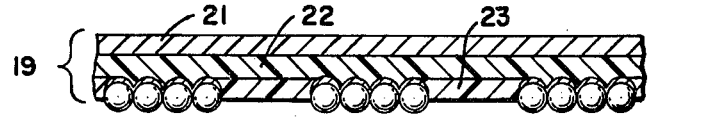

In step (e), the release sheet 12 is stripped from the structures 19 or 24, taking with it the spheres which have been forced into the bottom of grooves 18 by die elements 17. FIG. 6 illustrates the resulting structure based on the embodiment of FIG. 5a, comprising the backing 21, the sphere binder structure 19, and the distributed groups of spheres 11, separated by flowable sphere binder layer 23.

Figure 7:
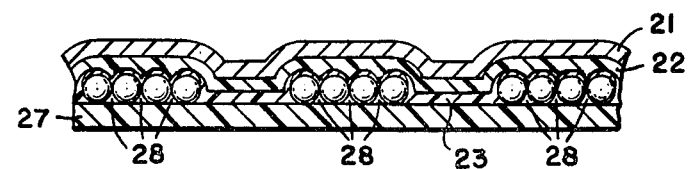

In step (f), as shown in FIG. 7, the structure illustrated in FIG. 6 is pressure consolidated with a clear, protective overlay film 27, using a resilient rubber roll to cause sphere binder structure 19 to bond with overlay film 27, especially by plastic flow of layer 23. From its rear structure the resulting structure has indentations corresponding to the grid pattern initially imposed on the sphere covered release sheet 12, due to the pressure of the rubber roll at such points. If desired, the bonding can be improved before the consolidation by exposing the sphere binder layer 23 to solvent vapor to make it tacky. Bonding can also be achieved by use of heated rubber rolls or by application of an adhesive but a tacky condition of layer 23 generally makes such expedients unnecessary. It is important to maintain the pressure of the rubber roll at low levels so that the sphere binder layer 23 or the overlay film 27 does not flex or flow into the air pockets 28 between the spheres. If such pockets become filled, the light transmission qualities of the spheres and light reflectivity from the layer 15 changes with resulting loss of brilliance and angularity.

Film 27 may be any weatherable, highly transparent (at least about 90% parallel white transmission) flexible film. Suitable types are thermoplastic or thermoset acrylic homopolymer, copolymer and heteropolymer (core-shell) films, including stretch oriented polymethyl methacrylate. A suitable thickness is about 2-4 mils. The film may contain transparent dyes or pigments, if desired. Preferably, it has a coefficient of expansion equivalent to that of the sphere binder resin.

The backing layers 21 or 25 may be removed or left in place if it is desired to maintain some rigidity in the structure. Whether backing 21 is removed or left in place, to the resulting structure on its rear surface (the upper surface shown in FIG. 7) may be applied a mounting adhesive and release liner for convenience in attaching the resulting structure to a support such as a highway post, automobile, advertising plate and the like. Mounting adhesives are well-known and commercially available for this purpose.

The backing materials, resins, films, glass spheres and apparatus for consolidating or laminating in any of the steps of the invention are individually known and commercially available. Also, sphere binder layers 22, 23 and 26 may be pigmented or colored, or contain any other additives to provide specialized properties, such as flame retardance and the like. The invention relates primarily to the sequence of steps and conditions to provide effective anchoring points in the retroreflective sheeting with consequent improved resistance to delamination.

The following examples are intended as further illustration of the invention but are not necessarily limitative except as set forth in the claims.

While the invention has thus been illustrated and described in what are considered to be the most practical and preferred embodiments, it will be recognized that many variations are possible and come within the scope thereof, the appended claims therefore being entitled to a full range of equivalents.

EXAMPLE 1

A. A sphere carrier is prepared by laminating 6 mil polyethylene films to each side of a 5 mil paper sheet. Although it is necessary to apply the film only to one side of the paper it is useful to apply film to the back side of the paper as well to prevent curling of the carrier. The top side of the carrier is given a light coating (0.01-0.1 mils) of silicone release agent (e.g., "KRYLON" Release Spray No. 1328) to prevent unduly strong bonding of the polyethylene film to glass spheres to be used in the product.

B. Glass spheres of 1.95 refractive index and 3 mils diameter are deposited onto the silicone coated side of the carrier. The sphere-covered carrier is then heated 2-3 minutes at 300°-350° F. to float the spheres in the softened polyethylene. The glass spheres thus become embedded in the polyethylene to about a sphere radius depth and form a monolayer therein with little or no space between spheres in the monolayer.

C. The sphere covered carrier is then tilted to allow excess (non-adhered) spheres to drop off and the sphere coated side of the carrier is vacuum metallized with aluminum to provide a reflective coating of about 1000A thickness. The reflective coating does not contact those portions of the sphere surfaces which are embedded in the polyethylene film of the carrier.

D. The carrier with the metallized spheres thereon is then passed through metal rolls to emboss a grid pattern onto the sphere coated hexagonal side. The lower roll has a smooth surface and is unheated. The upper roll is heated to about 300° F. and has a raised hexagonal grid structure on its surface. Roll pressure is adjusted such that contact with the upper, embossing roll is limited to the closed network grid lines only and such that the spheres contacted by the grid lines are forced into the polyethylene film of the carrier along the grid network to a depth of at least the sphere radius, preferably to a depth of at least the sphere diameter. As a result, the monolayer of spheres on the film is separated or distributed into groups of monolayered spheres, the missing spheres having been forced into the film to a greater depth.

E. A 4 mil cast film of a thermoplastic acrylic resin (Acryloid B72 resin, Rohm and Haas Comapny) on a 6 mil paper release liner is placed over those metallized spheres remaining in the monolayer on the sphere carrier surface such that the film contacts the metallized spheres. The composite stack is then heated in an air oven to about 200° F. to soften the surface of the resin and is passed through metal nip rolls preheated to about 250° F. The pressure exerted by the rolls is adjusted to prevent contact between the softened resin surface and the metallized polyethylene or any metallized spheres in the grid lines (grooves) imposed by the previous embossing step. The softened resin thus acts as a sphere binder, i.e., it binds the monolayer of spheres into permanent position.

F. The laminated composite is cooled to room temperature and the sphere binder and its release liner are pulled from the sphere carrier. The groups of outermost spheres remaining in the monolayer separate from the sphere carrier and are present on the sphere binder at locations other than those corresponding to the grid lines.

G. The surface of the sphere binder composite, on the side which contains spheres, is made tacky by exposure to the vapor from a methyl ethyl ketone impregnated pad for about 1–2 minutes. The tacky side of the composite is placed against a clear, flexible, weatherable 3 mil thick film of strength oriented polymethyl methacrylate. The resulting composite is mated by passing the composite through soft rubber nip rolls operated at a pressure adjusted such that the sphere binder and overlay film bond at the grid line locations and flow of sphere binder into any channels (which may exist between spheres) and into contact with sphere surfaces not coated with aluminum, is avoided. The overlay film has sufficient hardness to avoid flow or flexing into the air pockets between the film and the spheres.

H. The wedded retroreflective composite is then dried for a few minutes at about 150° F. to remove most of the methyl ethyl ketone. If desired, a mounting adhesive (about 1½ mils thick) on a release liner is then laminated to the side of the composite opposite the overlay film to form a retroreflective decal.

The resulting retroreflective sheeting exhibits brightness levels of 300 candlepower per footcandle per square foot at 0.22° divergence and incidence angles of from −40° to +40°. The sheeting will withstand delamination by weathering under outdoor conditions with little change in reflectivity.

EXAMPLE 2

Retroreflective sheeting is prepared essentially as described in Example 1 except for substitution, in paragraph E, of a two-layered sphere binder material. The material is formed by coating a first acrylic resin (Rhoplex AC-658, Rohm and Haas Company) onto a 6 mil thick release paper to give a 2 mil dry film. The resin is dried at 200° F. and cured for 1 minute at 300° F. A second acrylic resin (Acryloid B-72, Rohm and Haas Company) is then coated on top of the first resin coating and is dried at about 200° F. to give a 1 mil thick top film.

The resulting sphere binder composite is then laminated to the distributed monolayer of reflective spheres in the polyurethane sphere carrier such that the second acrylic film of the sphere binder composite is in contact with the reflectively coated surfaces of the spheres.

The use of this form of sphere binder has the advantage that because the first acrylic resin does not soften and flow under the lamination conditions as does the second resin, the extent to which the spheres are embedded in the sphere binder can be more easily controlled, merely by selecting a suitable thickness for the second resin. The harder first resin also contributes to greater dimensional stability in the composite.

I claim:

1. A method of preparing retroreflective sheeting comprising the steps of:

a. temporarily adhering a monolayer of glass spheres of substantially uniform diameter to a release sheet;
b. covering the exposed surfaces of the glass spheres with a light reflecting material to form a light reflecting layer on said monolayer of glass spheres;
c. imparting a grid pattern to the monolayer of glass spheres on the light reflecting layer thereof such that the depth of the grid pattern is at least the radius of the glass spheres remaining in said monolayer;
d. applying a sphere binder layer over said grid pattern imposed on the monolayer of glass spheres, said sphere binder layer having sufficient plastic flow to adhere to the light reflecting layer on said monolayer of spheres but not to the opposing surfaces of said spheres;
e. removing said release sheet to leave a distributed sphere covered sheet; and
f. pressure consolidating said distributed sphere covered sheet against a clear, protective overlay film, said overlay film bonding to said sphere binder layer in the grooves defined by the grid pattern.

2. A method as in claim 1 wherein the sphere binder layer is a composite of a first film and a second film, said first film having sufficient hardness to prevent said spheres from becoming imbedded therein, the second film being in contact with and bonded to said light reflecting layer, the thickness of the second film in the grooves formed by the grid pattern being no greater than the radius of the spheres.

3. A method as in claim 2 wherein the diameter of the spheres is about 1–10 mils, and the dry thickness of each of the films is about 1–3 mils.

4. A method as in claim 1 wherein the depth of the grid pattern imparted in step (c) is greater than the diameter of said spheres.

5. A method as in claim 1 wherein the diameter of the spheres is about 1–10 mils and the dry thickness of the sphere binder layer is about 2–4 mils.

6. A method as in claim 1 wherein, in step (b), the light reflecting material is a metal film which is vacuum deposited.

7. A method as in claim 1 wherein, in step (f), the pressure consolidating is effected by passing the distributed sphere covered sheet and overlay film in superposition through soft rubber nip rolls, said overlay film having sufficient hardness to avoid flow into the air pockets between said overlay film and the glass spheres, the consolidation pressure being such as also to avoid plastic flow of said sphere binder layer material into said air pockets.

8. A method as in claim 1 wherein, in step (c), the grid pattern is imposed by a die means.

9. A method as in claim 8 wherein the die means comprises a heated engraved roll or a stamp roll.

* * * * *

UNITED STATES PATENT AND TRADEMARK OFFICE
CERTIFICATE OF CORRECTION

PATENT NO. : 4,075,049
DATED : February 21, 1978
INVENTOR(S) : William A. Wood

It is certified that error appears in the above-identified patent and that said Letters Patent are hereby corrected as shown below:

In column 1, line 66, "of" should be --to--.

In column 4, line 44, "place" should be --placed--.

In column 7, line 3, "strength" should be --stretch--.

In column 7, line 42, "polyurethane" should be --polyethylene--.

*Signed and Sealed this*

*Eleventh* Day of *July 1978*

[SEAL]

Attest:

RUTH C. MASON
*Attesting Officer*

DONALD W. BANNER
*Commissioner of Patents and Trademarks*